United States Patent
Kriz et al.

(10) Patent No.: US 9,068,129 B2
(45) Date of Patent: Jun. 30, 2015

(54) UPGRADING PROPERTIES OF ASPHALTS WITH WAX

(71) Applicant: ExxonMobil Research and Engineering Company, Annandale, NJ (US)

(72) Inventors: Pavel Kriz, Sarnia (CA); Katherine Lynn Sokol, Sarnia (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 399 days.

(21) Appl. No.: 13/623,271

(22) Filed: Sep. 20, 2012

(65) Prior Publication Data

US 2014/0076777 A1    Mar. 20, 2014

(51) Int. Cl.
| | |
|---|---|
| *C10G 3/00* | (2006.01) |
| *C10G 21/20* | (2006.01) |
| *C08L 95/00* | (2006.01) |
| *C10G 21/16* | (2006.01) |
| *C10G 53/06* | (2006.01) |
| *C10G 21/00* | (2006.01) |
| *C10C 3/00* | (2006.01) |
| *C08L 91/06* | (2006.01) |

(52) U.S. Cl.
CPC . *C10G 21/20* (2013.01); *C10C 3/00* (2013.01); *C08L 91/06* (2013.01); *C08L 95/00* (2013.01); *C10G 21/16* (2013.01); *C10G 53/06* (2013.01); *C10G 21/00* (2013.01); *C10G 2300/1074* (2013.01)

(58) Field of Classification Search
CPC ......... C08L 23/02; C08L 95/00; C08L 91/06; C10G 21/16; C10G 21/00; C10G 21/20; C10G 53/06; C10G 2300/1074; C10C 3/00
USPC .................. 208/4; 524/59; 106/229, 268, 270
See application file for complete search history.

(56) References Cited

U.S. PATENT DOCUMENTS 2,848,429 A    8/1958  Woodruff et al.
3,989,616 A *  11/1976 Pagen et al. ...................... 208/6
(Continued)

OTHER PUBLICATIONS

H.I. Al-Shafey, A.I. Hashem, R.S. Abdel Hameed and E.A. Dawood, "Studies on the Influence of Long Chain Acrylic Esters Co-Polymers Grafted with Vinyl Acetate as Flow Improver Additives of Crude Oils", Advances in Applied Science Research, 2011, 2 (5), pp. 476-489.

C.A. Irani, D.S. Schuster and R.T. Yin, "Understanding the Pour Point Depression Mechanism-II Microfiltration Analysis of Crude Oils", 189th ACS Natl. Meet., 1985, vol. 30, No. 1pp. 169-177.

(Continued)

*Primary Examiner* — Randy Boyer
*Assistant Examiner* — Juan Valencia
(74) *Attorney, Agent, or Firm* — Larry E. Carter; Robert A. Migliorini

(57) ABSTRACT

Methods are provided for upgrading the quality of an asphalt containing wax. This can include base asphalts that naturally contain elevated levels of wax, such as base asphalts with a wax content of at least 3.0 wt %. Additionally or alternately, this can include a base asphalt containing subsequently added wax. Wax generated at a refinery can be added to an asphalt along with a pour point depressant to form an asphalt product. The additional wax can reduce the viscosity of the asphalt product at higher temperatures so that the asphalt product can be mixed and stored at a lower temperature. Additionally, the pour point depressant can unexpectedly improve the low temperature properties of the wax-containing asphalt product.

20 Claims, 13 Drawing Sheets

(56) References Cited

U.S. PATENT DOCUMENTS

| | | | |
|---|---|---|---|
| 5,228,977 A * | 7/1993 | Moran et al. | 208/44 |
| 7,857,094 B2 | 12/2010 | Macquisten et al. | |
| 7,893,139 B2 | 2/2011 | Morifusa | |
| 7,951,239 B2 | 5/2011 | Trumbore et al. | |
| 7,951,240 B2 | 5/2011 | Trumbore et al. | |
| 2010/0227954 A1 | 9/2010 | Naidoo et al. | |
| 2010/0319577 A1* | 12/2010 | Naidoo et al. | 106/235 |
| 2011/0041729 A1 | 2/2011 | Colange et al. | |
| 2011/0197785 A1 | 8/2011 | Trumbore et al. | |
| 2011/0203484 A1 | 8/2011 | Hwang et al. | |

OTHER PUBLICATIONS

A. Jamshidi, M.O. Manzah and Z. You, "Performance of Warm Mix Asphalt Containing Sasobit: State-of-the-Art", Construction and Building Materials, vol. 38, 2013, pp. 550-553.

Y. Edwards, Y. Tasdemir and U. Isacsson, "Rheological Effects of Commercial Waxes and Polyphosphoric Acid in Bitumen 160/220-Low Temperature Performance", Fuel, vol. 85, No. 7-8, 2006, pp. 989-997.

PCT Application No. PCT/US2013/060507, Communication from the International Searching Authority, Form PCT/ISA/210, dated Feb. 6, 5 pages.

* cited by examiner

UPGRADING PROPERTIES OF ASPHALTS WITH WAX

FIELD

This disclosure provides methods for improving the properties of asphalt compositions.

BACKGROUND

Asphalt is one of the world's oldest engineering materials, having been used since the beginning of civilization. Asphalt is a strong, versatile and chemical-resistant binding material that adapts itself to a variety of uses. For example, asphalt is used to bind crushed stone and gravel into firm tough surfaces for roads, streets, and airport runways. Asphalt, also known as pitch, can be obtained from either natural deposits, or as a by-product of the petroleum industry. Natural asphalts were extensively used until the early 1900s. The discovery of refining asphalt from crude petroleum and the increasing popularity of the automobile served to greatly expand the asphalt industry. Modern petroleum asphalt has the same durable qualities as naturally occurring asphalt, with the added advantage of being refined to a uniform condition substantially free of organic and mineral impurities.

Most of the petroleum asphalt produced today is used for road surfacing. Asphalt is also used for expansion joints and patches on concrete roads, as well as for airport runways, tennis courts, playgrounds, and floors in buildings. Another major use of asphalt is in asphalt shingles and roll-roofing which is typically comprised of felt saturated with asphalt. The asphalt helps to preserve and waterproof the roofing material. Other applications for asphalt include waterproofing tunnels, bridges, dams and reservoirs, rust-proofing and sound-proofing metal pipes and automotive under-bodies; and sound-proofing walls and ceilings.

The raw material used in modern asphalt manufacturing is petroleum, which is naturally occurring liquid bitumen. Asphalt is a natural constituent of petroleum, and there are crude oils that are almost entirely asphalt. The crude petroleum is separated into its various fractions through a distillation process. After separation, these fractions are further refined into other products such as asphalt, paraffin, gasoline, naphtha, lubricating oil, kerosene and diesel oil. Since asphalt is the base or heavy constituent of crude petroleum, it does not evaporate or boil off during the distillation process. Asphalt is essentially the heavy residue of the oil refining process.

U.S. Patent Application Publication 2010/0319577 describes asphalt modifiers for "warm mix" applications. An asphalt is combined with 0.2 wt % to 10 wt % of an additive package. The additive package is described as including from 10-60 wt % of an amine or modified amine surfactant and from 20-90 wt % of a rheology modifying component corresponding to a mixture of a wax and a vegetable or petroleum resin.

SUMMARY in an aspect, a method for upgrading an asphalt feed is provided. The method includes fractionating a feedstock containing at least a portion derived from a mineral crude oil at a cut point of at least 750° F. (399° C.) to form an asphalt fraction that contains a first amount of wax; and mixing the asphalt fraction with a pour point depressant to form an asphalt product, an amount of the pour point depressant being less than 10 wt % of an amount of wax in the asphalt product, the amount of wax in the asphalt product being at least 3 wt %.

In some aspects, the asphalt fraction can additionally be mixed with a refinery wax, such as at least 3 wt % of a refinery wax.

In another aspect, a method for upgrading an asphalt feed is provided. The method includes fractionating a feedstock containing at least a portion derived from a mineral crude oil to form an asphalt fraction and one or more vacuum gas oil fractions, a cut point between the asphalt fraction and a vacuum gas oil fraction being at least 750° F. (399° C.); dewaxing at least a portion of the one or more vacuum gas oil fractions under effective solvent dewaxing conditions to form a dewaxed vacuum gas oil and a refinery wax product; and mixing the asphalt fraction with a pour point depressant and at least 3 wt % of the refinery wax product to form an asphalt product, an amount of the pour point depressant being less than 10 wt % of an amount of wax in the asphalt product, the amount of wax in the asphalt product comprising the refinery wax.

DETAILED DESCRIPTION

Figure 1:
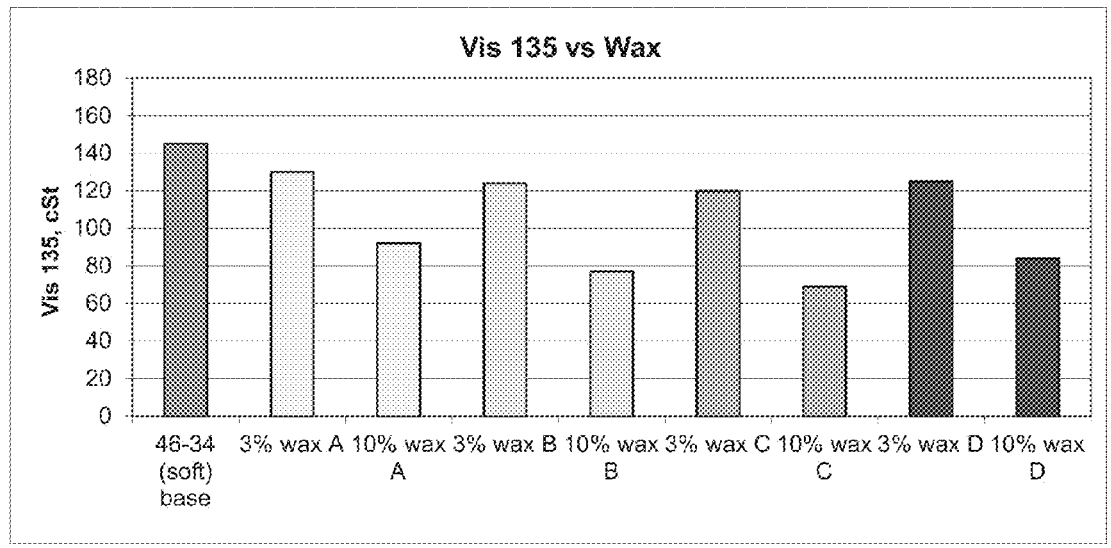
FIGS. 1 and 2 show high temperature properties of asphalts including various amounts of wax.

All numerical values within the detailed description and the claims herein are modified by "about" or "approximately" the indicated value, and take into account experimental error and variations that would be expected by a person having ordinary skill in the art.

Overview

In various aspects, methods are provided for upgrading the quality of an asphalt containing wax. This can include base asphalts that naturally contain elevated levels of wax, such as base asphalts with a wax content of at least 3.0 wt %. Additionally or alternately, this can include a base asphalt containing subsequently added wax. Wax generated at a refinery can be added to an asphalt along with a pour point depressant to form an asphalt product. The additional wax can reduce the viscosity of the asphalt product at higher temperatures so that the asphalt product can be mixed and stored at a lower temperature. Additionally, the pour point depressant can unexpectedly improve the low temperature properties of the wax-containing asphalt product.

Petroleum waxes are generally considered as unfavorable components of paving asphalts. Wax crystallization typically leads to stiffening and embrittlement of asphalts, which results in less favorable binder low temperature performance.

Typically, the amount of crystallinity for a wax at a given temperature is dependent on the nature of the wax. Wax molecules with greater degrees of saturation, linearity, and/or molecular weight uniformity will tend to form crystals more readily and/or form larger crystals. The negative impact of such waxes on low temperature properties of given asphalt will also typically be more apparent.

While petroleum waxes are conventionally viewed as an unfavorable component, addition of a wax to an asphalt can potentially reduce the asphalt storage tank temperature for an asphalt, such as by at least 30° C., while also allowing for reduced mixing and compaction temperatures. Reducing the various temperatures associated with asphalt storage, mixing, and compaction results in lower energy usage. Reducing temperatures associated with asphalt storage, mixing, and compaction can also reduce emissions based on asphalt fumes. In addition to reducing air pollution, this can also allow for use of asphalt in locations with strict regulations on air emissions. Reduced mixing temperatures can also allow for asphalt use at cooler temperatures, which extends the portion of the year when paving can be performed.

One way of characterizing the properties of an asphalt (or corresponding asphalt feed) is to consider the performance of the asphalt or asphalt feed in three temperature ranges. A first temperature range corresponds to storage, mixing, and compacting temperatures for the asphalt. This is the highest temperature range of the three temperature ranges. This is the temperature range that corresponds to a fluid state for the asphalt that allows the asphalt to be applied to a surface. The storage and mixing temperatures for an asphalt are also in this range, so that the asphalt can remain in a fluid, well-mixed state prior to use. The low temperature end point for the first temperature range is related to the temperature required to maintain the asphalt in a sufficiently fluid state during storage and mixing. As a result, additives that can lower the viscosity of an asphalt in this temperature range may be desirable, as such additives can lower the temperature of the first temperature range for a given asphalt.

A second temperature range for an asphalt corresponds roughly to the high temperature end of the performance range for the asphalt. For a given asphalt application, the asphalt can have low and high boundary temperatures that roughly describe the effective operating range for the asphalt. The SUPERPAVE™ temperature grade is an example of one method for specifying the low and high temperature operating boundaries for a paving asphalt. In this second temperature range corresponding to the high temperature end of the performance range, the typical problem for an asphalt is softening due to the asphalt approaching a solid-liquid "transition" temperature, resulting in undesirable flow of the asphalt. This is not a true phase transition, but instead is a continuous change with temperature in the modulus of the asphalt material, resulting in a continuous change from a material that is more similar to a viscoelastic solid to a material that is more similar to a viscous liquid. Thus, additives that tend to increase the solid or crystalline character of an asphalt may be desirable in this temperature range. Alternatively, additives that do not substantially impact the high temperature performance of the asphalt while improving other properties can also be desirable.

A third temperature range for an asphalt corresponds roughly to the low temperature end of the performance range for the asphalt. In this third temperature range, the asphalt is clearly a solid, so there is less concern the asphalt being too soft. Instead, in this temperature range the typical concerns relate to the asphalt becoming brittle and/or cracking due to temperature swings. Due to the variety of components present in asphalt, differential expansion of some portions of an asphalt relative to other portions is possible, leading to cracks or fractures as temperature changes. Additionally, phase interfaces, particle, and/or other interfaces within an asphalt may contribute to brittleness of the asphalt. As a result, an asphalt with a lower amount of crystalline character may be beneficial, to reduce the number of solid-solid boundaries and the potential for differential temperature expansion.

In various aspects, one solution for improving and/or maintaining the properties of an asphalt relative to all three of the above temperature ranges is to add both a wax and a pour point depressant to the asphalt. By itself, a suitable wax can maintain or improve the properties of an asphalt in the first two temperature ranges. In the first temperature range, a suitable wax can be at a temperature above the melting point of the wax. In a liquid state, a wax will typically serve as a low viscosity component within an asphalt. Thus, in the first temperature range, addition of a wax can allow for storage and mixing of an asphalt at a reduced temperature. In the second temperature range, some suitable waxes can have a melting point above the high temperature boundary (such as high temperature performance grade) for use of the asphalt. For such a wax, the wax will form a crystalline or quasi-crystalline phase in the second temperature range if a sufficient amount of wax is present to allow for crystal formation. Any wax crystallization that occurs is likely to improve the high temperature performance of the asphalt. Alternatively, if the wax is above the crystallization temperature, or if the wax is not present in sufficient amounts to crystallize, the wax may act as a softening agent that reduces the hardness at high temperature. Preferably, such a wax does not substantially harm the high temperature performance properties.

By contrast, in the third temperature range a wax additive has the potential to harm the performance of an asphalt. In the third temperature range, a typical wax will be well below the crystallization temperature for the wax. Depending on the nature of the wax, the wax will have a tendency to form larger crystals. These larger crystalline structures may increase the brittleness of an asphalt, leading to a higher temperature for the low temperature boundary for use of the asphalt. However, this tendency to form larger crystalline structures can be mitigated by use of a pour point depressant. A pour point depressant is a material that inhibits formation of larger wax crystals and therefore allows a wax-containing substance to remain in a fluid state at lower temperatures. By reducing the tendency to form larger wax crystal structures, a pour point depressant can improve the low temperature properties of an asphalt that contains either added wax or wax that was initially present in the asphalt feed.

In addition to avoiding harm due to wax addition, the combination of adding a wax and a pour point depressant can provide an unexpected benefit for the low temperature performance of hard asphalts, such as asphalts with a low temperature performance grade of −22° C. or higher. For such asphalts, adding a pour point depressant without addition of any wax will typically have little or no impact on the low temperature properties of the asphalt. Addition of a wax in quantities that avoid crystallization can improve the low temperature performance of such an asphalt. Surprisingly, a pour point depressant can provide further improvement in the low temperature properties of such an asphalt.

One potential application for upgrading an asphalt with wax and a pour point depressant is to improve the overall yield of desirable products from a crude oil feed. An asphalt is a residual fraction formed after distillation. Increasing the distillation cut point for defining an asphalt will result in a higher yield of vacuum gas oil. However, the resulting asphalt will also typically have inferior properties. Adding wax and a pour point depressant to such an inferior asphalt can improve the asphalt quality. Additionally, the source of the wax for improving the asphalt can be residual wax from another refinery process, such as slack wax generated from solvent dewaxing of the vacuum gas oil during lubricant production. Such a slack wax is typically used for a lower value purpose, such as use as a feed for fluid catalytic cracking to form naphtha. Thus, an increase in yield of a higher value vacuum gas oil can be achieved by combining two lower value feeds in the form of asphalt and slack wax.

Alternatively, a pour point depressant can be added to an asphalt that has a high wax content, such as a wax content of 3 wt % or greater, or 5 wt % or greater, or 8 wt % or greater. Asphalt feeds with elevated wax contents are conventionally viewed as not being suitable for use in firming high quality asphalts. Use of a pour point depressant to modify the properties of the wax in the asphalt can allow waxy asphalts to be upgraded to higher value uses.

Asphalt and Wax Feedstocks

Some feedstocks in accordance with the present disclosure are heavy oils that include at least a portion of asphaltenes. Such heavy oils are suitable, possibly after additional distillation, for making an asphalt. Asphalt is a viscoelastic semi-solid bituminous material derived from the distillation residue of crude petroleum. Asphalt may be obtained from a variety of heavy oil sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Because it is hydrophobic and has good adhesive and weathering characteristics, asphalt is widely used as a binder or cement for stone or rock aggregate in pavement construction (typically only 5 wt % of the mixture). Other feedstocks suitable for use in the disclosure include whole or reduced petroleum crude oils, atmospheric residua feedstocks, and vacuum residua feedstocks.

One option for defining a boiling range is to use an initial boiling point for a feed and/or a final boiling point fir a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil. Similarly, a "T95" boiling is defined as the temperature at which 95 wt % of the feed will boil.

A typical feedstock for forming asphalt can have a normal atmospheric boiling point of at least 350° C., more typically at least 400° C., and will have a penetration range from 20 to 500 dmm at 25° C. (ASTM D-5). Alternatively, a feed may be characterized using a T5 boiling point, such as a feed with a T5 boiling point of at least 350° C., or at least 400° C., or at least 440° C.

Another example of a feedstock suitable for forming asphalt is a feedstock derived from an atmospheric resid fraction or a similar petroleum fraction. For example, when a whole crude oil, partial crude oil, or other feedstock is processed in a refinery, one common type of processing is to distill or fractionate the crude oil based on boiling point. One type of fractionation is atmospheric distillation, which can result in one or more fractions that boil at less than 650° F. (343° C.) or less than 700° F. (371° C.), and a bottoms fraction. This bottoms fraction corresponds to an atmospheric resid.

The bottoms fraction from atmospheric distillation can then be separated or fractionated using vacuum distillation. This generates one or more (vacuum) gas oil fractions and a vacuum resid fraction. Because the vacuum distillation is typically performed on a resid from atmospheric distillation, a vacuum gas oil fraction can be defined as a fraction with a T10 boiling point of at least 650° F. (343° C.), such as at least 700° F. (371° C.). Preferably, a vacuum gas oil fraction can have a T5 boiling point of at least 650° F., such as at least 700° F. The vacuum resid fraction may be suitable for use as an asphalt. The distillation cut point for forming the vacuum bottoms fraction can be selected based on a desired amount of vacuum gas oil and/or a desired quality for the asphalt fraction. Selecting a higher temperature cut point can increase the amount of a vacuum gas oil. However, such a higher temperature cut point will typically reduce the quality of the corresponding asphalt. Since both vacuum gas oil yield and asphalt quality are also dependent on the nature of the feedstock, the temperature cut point to achieve a desired combination of vacuum gas oil yield and asphalt quality will vary. A suitable cut point for the vacuum bottoms fraction to achieve a desired asphalt quality and/or to achieve a desired vacuum gas oil yield can be at least 750° F. (399° C.), such as at least 950° F. (510° C.) or at least 1050° F. (566° C.). Because adding wax and a pour point depressant can improve the properties of an asphalt feed, lower quality asphalts can be improved to allow for higher value uses. Thus, asphalts derived based on a cut point of at least 1100° F. (593° C.) or at least 1150° F. (621° C.) may also be suitable. This can allow for a further increase in the amount of vacuum gas oil derived from a given feedstock.

In addition to asphalt, a feedstock suitable for forming a refinery wax can also be used. One common source of refinery wax is wax formed during solvent dewaxing of a lubricant boiling range feed, such as a vacuum gas oil feed. More generally, suitable feedstocks for use as a lubricant boiling range feed can include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

Typical boiling ranges for such feeds include, for example, feeds with an initial boiling point of at least 650° F. (343° C.), or at least 700° F. (371° C.), or at least 750° F. (399° C.). Alternatively, a feed may be characterized using a T5 boiling point, such as a feed with a T5 boiling point of at least 650° F. (343° C.), or at least 700° F. (371° C.), or at least 750° F. (399° C.). In some aspects, the final boiling point of the feed can be at least 1100° F. (593° C.), such as at least 1150° F. (621° C.) or at least 1200° F. (649° C.). In other aspects, a feed may be used to form refinery wax that does not include a large portion of molecules that would traditional be considered as vacuum distillation bottoms. For example, the feed may correspond to a vacuum gas oil feed that has already been separated from a traditional vacuum bottoms portion. Such feeds include, for example, feeds with a final boiling point of 1150° F. (621° C.), or 1100° F. (593° C.) or less, or 1050° F. (566° C.) or less. Alternatively, a feed may be characterized using a T95 boiling point, such as a feed with a T95 boiling point of 1150° F. (621° C.) or less, or 1100° F. (593° C.) or less, or 1050° F. (566° C.) or less. An example of a suitable type of feedstock is a wide cut vacuum gas oil (VGO) feed, with a T5 boiling point of at least 700° F. (371° C.) and a T95 boiling point of 1100° F. or less. Optionally, the initial boiling point of such a wide cut VGO feed can be at least 700° F. and/or the final boiling point can be at least 1100° F. It is noted that feeds with still lower initial boiling points and/or T5 boiling points may also be suitable, so long as sufficient higher boiling material is available so that the overall nature of the process is a lubricant base oil production process and/or a fuels hydrocracking process.

For a given feed, in order to form a refinery wax, one option is to fractionate the feed into one or more fractions with various viscosities prior to dewaxing. Depending on the initial feed, a dewaxing feed may be capable of producing feeds for solvent dewaxing with viscosities ranging from 100N (a feed fir forming a light lubricant base oil) to 2500N (a brightstock feed) or greater. Preferably, the viscosity of the feed used for generating the refinery wax is at least 300N, such as at least 500N.

Refinery Wax Production

One potential source of wax in a refinery setting is slack wax generated during solvent dewaxing of a lubricant boiling range feed, such as a vacuum gas oil feed. Typically a slack wax can contain 10 wt % or more of oil in the slack wax. Optionally, additional processing can be performed before or after a solvent dewaxing process to reduce the amount of oil present in the wax generated during solvent dewaxing. Waxes formed from solvent dewaxing having oil in wax contents of less than 10 wt % can also be referred to as scale waxes. These slack or scale waxes represent one type of suitable wax for addition to an asphalt, along with a pour point depressant, to improve the properties of the asphalt. In various alternative aspects, wax generated from other processes in a refinery can also be used as a wax for addition to an asphalt.

For the discussion herein, a refinery wax is defined as a wax derived from a mineral petroleum feed after one or more optional refinery processing steps. Such processing can include distillation/fractionation processes, extraction processes, separation processes, catalytic processes including hydroprocessing, as well as any other types of processes during processing of a whole crude oil, partial crude oil, or other mineral feedstock in a refinery setting. A refinery wax is distinct from a synthetic wax, such as a wax formed using a Fischer-Tropsch process. A synthetic wax is defined as a wax formed by a process where the average molecular weight of the components in a feed that forms the wax increase by 300% or more during the process. In some aspects, a portion of synthetic wax can be added to a refinery wax used for improving asphalt properties. Similarly, a wax from a non-mineral source, such as a wax derived from processing of a feed of biological origin, can be added to a refinery wax. However, a wax feed comprised of only synthetic wax and/or wax from a non-mineral source is excluded from the definition of a refinery wax.

Two types of solvent processing can be performed on a vacuum gas oil or other petroleum fraction during formation of a lubricant base oil. The first type of solvent processing is a solvent extraction to reduce the aromatics content. The solvent extraction process selectively dissolves aromatic components to form an aromatics-rich extract phase while leaving the more paraffinic components in an aromatics-poor raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases. Any convenient type of liquid-liquid extractor can be used, such as a countercurrent liquid-liquid extractor. Depending on the initial concentration of aromatics in the deasphalted bottoms, the raffinate phase can have an aromatics content of 5 wt % to 25 wt %. For typical feeds, the aromatics contents will be at least 10 wt %.

The raffinate from the solvent extraction is preferably under-extracted. In such preferred aspects, the extraction is carried out under conditions such that the raffinate yield is maximized while still removing most of the lowest quality molecules from the feed. Raffinate yield may be maximized by controlling extraction conditions, for example, by lowering the solvent to oil treat ratio and/or decreasing the extraction temperature. The raffinate from the solvent extraction unit can then be solvent dewaxed under solvent dewaxing conditions to remove hard waxes from the raffinate.

Solvent dewaxing typically involves mixing the raffinate feed from the solvent extraction unit with chilled dewaxing solvent to form an oil-solvent solution. Precipitated wax is thereafter separated by, for example, filtration. The temperature and solvent are selected so that the oil is dissolved by the chilled solvent while the wax is precipitated.

An example of a suitable solvent dewaxing process involves the use of a cooling tower where solvent is prechilled and added incrementally at several points along the height of the cooling tower. The oil-solvent mixture is agitated during the chilling step to permit substantially instantaneous mixing of the prechilled solvent with the oil. The prechilled solvent is added incrementally along the length of the cooling tower so as to maintain an average chilling rate at or below 10° F. per minute, usually between 11° F. to 5° F. per minute. The final temperature of the oil-solvent/precipitated wax mixture in the cooling tower will usually be between 0° F. and 50° F. (−17.8° C. to 10° C.). The mixture may then be sent to a scraped surface chiller to separate precipitated wax from the mixture.

Representative dewaxing solvents are aliphatic ketones having 3-6 carbon atoms such as methyl ethyl ketone and methyl isobutyl ketone, low molecular weight hydrocarbons such as propane and butane, and mixtures thereof. The solvents may be mixed with other solvents such as benzene, toluene or xylene.

In general, the amount of solvent added will be sufficient to provide a liquid/solid weight ratio between the range of 5/1 and 20/1 at the dewaxing temperature and a solvent/oil volume ratio between 1.5/1 to 5/1. The solvent dewaxed oil is typically dewaxed to an intermediate pour point, preferably less than +10° C., such as less than 5° C. or less than 0° C. The resulting solvent dewaxed oil is suitable for use in forming one or more types of Group I base oils. The aromatics content will typically be greater than 10 wt % in the solvent dewaxed oil. Additionally, the sulfur content of the solvent dewaxed oil will typically be greater than 300 wpm. However, solvent dewaxing can be performed on low sulfur content and/or low aromatics content feeds, if desired.

Properties of Mixtures of Asphalt Wax and Pour Point Depressant

In order to achieve benefits from the presence of wax in asphalt, the wax can be present in a sufficient concentration to allow for crystallization and melting of the wax. At low concentrations, the amount of wax in an asphalt feed may not be sufficient to allow the wax to crystallize. Conventionally, selecting asphalts with wax concentrations of 3 wt % or less has been desired in order to reduce or mitigate the impact of wax on asphalt properties.

In various aspects, the amount of wax added to an asphalt feed can be at least 3 wt %, such as at least 5 wt % or at least 8 wt %. For example, in some instances addition of at least 10 wt % of wax can allow ibr modification of the properties of an asphalt feed. Preferably, the amount of wax added to an asphalt feed can be 18 wt % or less, such as 15 wt % or less or 10 wt % or less. Additionally or alternately, the amount of wax added to an asphalt feed can correspond to a sufficient amount so that the wax initially present in the asphalt teed in combination with the added wax is at least 3 wt %, such as at least 5 wt %, or at least 8 wt %, or at least 10 wt %. In such aspects, the amount of wax added to the asphalt feed in combination with wax initially present in the feed can be 18 wt % or less, such as 15 wt % or less or 10 wt % or less.

In addition to a wax such as a refinery wax, a pour point depressant can also be added to an asphalt or asphalt feed. Pour point depressants are molecules that are suitable for reducing the size and/or growth rate of wax crystals formed in a wax-containing sample. Examples of typical pour point depressants include polymethacrylates, polyacrylates, polyfumarates, alklylated styrenes, alkylated naphthalenes, and copolymers incorporating at least one of the above types of monomer units. The amount of pour point depressant added to an asphalt can correspond to 0.5 wt % or less of the asphalt, such as 0.25 wt % or less or 0.1 wt % or less. The amount of pour point depressant can be at least 0.01 wt % (100 wppm) of the asphalt, such as at least 0.05 wt %. Additionally or alternately, the weight of pour point depressant can correspond to 10% or less of the weight of wax present in the asphalt after introduction of any additional wax, such as less than 8% of the weight of wax or less than 5% of the weight of wax. In some aspects, the weight of pour point depressant can be 10% or less of the weight of additional wax added to the asphalt, such as less than 8% or less than 5%.

EXAMPLES

One way of characterizing an asphalt composition is by using SUPERPAVE™ criteria. SUPERPAVE™ criteria (AASHTO M320) can be used to define the Maximum and Minimum Pavement service temperature conditions under which the binder must perform. SUPERPAVE™ is a trademark of the Strategic Highway Research Program (SHRP) and is the term used for new binder specifications as per AASHTO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders were measured by Bending Beam Rheometer (BBR). According to SUPERPAVE™ criteria, the temperature at which a maximum creep stiffness (S) of 300 MPa at 60 s loading time is reached is the stiffness temperature. The temperature at which a minimum slope on the creep stiffness versus time plot of 0.300 at 60 s loading time is reached is the m-value limiting temperature. The minimum temperature at which the binder will perform satisfactorily in pavement service is the higher of the two temperatures minus 10° C.

The SUPERPAVE™ binder specifications for asphalt paving binder performance establishes the high temperature and tow temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. In both HT and LT. This was established because the stiffness of asphalt doubles every 6° C. One can plot the performance of asphalt on a SUPERPAVE™ matrix grid. The vertical axis represents increasing high PG temperature stiffness and the horizontal axis represents decreasing low temperature stiffness towards the left. Each grid box represents a 6° C. by 6° C. box indicating the performance grade of an asphalt. Asphalt binders from a particular crude pass the SUPERPAVE™ specification criteria if they fall within the PG box through which the curves pass. Directionally poorer asphalt performance is to the lower right. Target exceptional asphalt or enhanced, modified asphalt performance is to the upper left, most preferably in both the HT and LT performance directions.

The examples below show results from a series of tests involving two types of asphalt feedstock, four types of wax, and five types of pour point depressants. The tests investigated variations in asphalt quality based on a variety of combinations of asphalt feed, wax, and pour point depressant.

The two base asphalts used in the tests were based on the same initial crude slate. The base asphalts corresponded to vacuum tower bottoms at two different temperature cut points from processing of the initial high quality asphaltic crude oil. The first base asphalt was a PG 46-34 (soft) asphalt with a PEN value at 25° C. of 372 dmm. This was intended to represent a roofing quality asphalt. The second base asphalt was formed using a higher temperature cut point in the vacuum tower, to represent an asphalt generated while maximizing fuel production, such as by increasing the amount of vacuum gas oil produced from the vacuum tower. The second base asphalt was a PG 76-16 (hard) asphalt with PEN value at 25° C. of 20 dmm. Both base asphalts had an initial wax content of less than 1 wt %. It is noted that in these tests, rolling thin-film oven and pressure aging vessel (PAV) aging was not performed on the asphalts prior to measuring properties. Additionally, the bending beam rheometer (BBR) tests were performed on the neat asphalt, which is believed to be suitable for comparison purposes. FIGS. 1-6 show results from tests on the 46-34 base asphalt with various additives, while FIGS. 7-12 show results from tests on the 76-16 base asphalt with various additives.

The four types of waxes used were commercially available refinery waxes generated after various types of refinery processing, such as solvent dewaxing. Wax A is a petroleum type wax, corresponding to a wax typically derived from solvent dewaxing of a brightstock. Wax A is a slack wax generated from a 2500N feed. Wax B is slack wax generated from a 600N feed. Wax C is a scale wax generated from a 260N feed. Wax C is partially refined, so that the oil-in-wax content is below 10%, Wax D is a slack wax generated from a 1400N feed. In the various tests, either 3 wt % or 10 wt % of one of waxes A-D was added to one of the two base asphalts.

The five types of pour point depressants (PPDs) were also commercially available products. Pour point depressant E is based on a styrene maleate copolymer. Pour point depressants F, G, and J are based on polymethacrylates. Pour point depressant H is based on a copolymer of alkylated fumarate and vinyl acetate. In the various tests that included a pour point depressant, 0.3 wt % of the specified pour point depressant was added to the asphalt.

FIGS. 1-4 show various properties of the first (46-34) base asphalt and the same base asphalt with addition of either 3 wt % or 10 wt % of one of the four refinery waxes. FIG. 1 shows that each of the waxes A-D have similar effectiveness for reducing the viscosity of the first base asphalt at 135° C. This effectiveness is increased by increasing the amount of added wax from 3 wt % to 10 wt %. Thus, each of the refinery waxes is effective for reducing the viscosity of the first (soft) base asphalt at elevated temperatures, such as mixing or storage temperatures.

Figure 2:
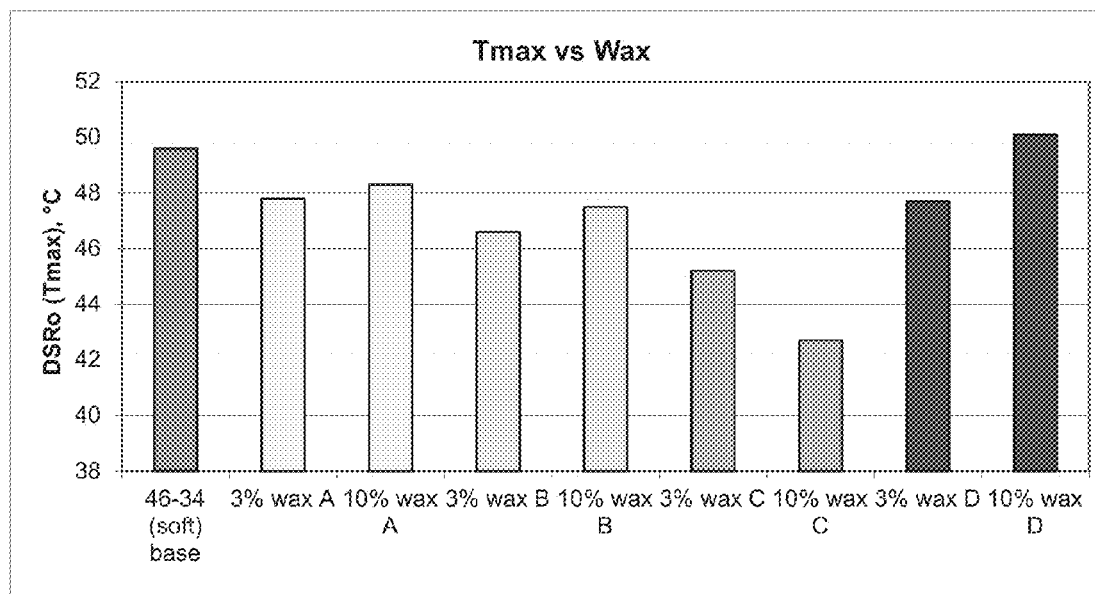

FIG. 2 shows that most of the waxes result in a modest loss in high temperature performance grade (HTPG) for the first base asphalt. The largest loss in HTPG was caused by wax C, which corresponds to the wax generated from the 260N feed. For waxes A, B, and D, increasing the amount of additional wax to 10 wt % resulted in a gain in HTPG relative to addition of 3 wt % wax. In fact, for wax D, the gain in HTPG at 10 wt % was sufficient to cause an increase in HTPG relative to the initial value for the first base asphalt. The increase in HTPG in moving from 3 wt % to 10 wt % is believed to be due to increased wax crystallization. At 3 wt %, the asphalt does not appear to contain sufficient wax to allow for wax crystal formation. At 10 wt %, at least some crystallization is occurring, resulting in the increase in HTPG.

The HTPG was also measured for the asphalts modified by pour point depressants. 0.3 wt % of each of pour point depressants E, F, G, H, and J was added to the first base asphalt and mixtures containing 10 wt % of a wax in the base asphalt. Each of the pour point depressants resulted in a modest increase in HTPG of less than 3° C. in the first base asphalt alone. When added to mixtures of 10% of a wax in asphalt, the pour point depressants also resulted in a less than 3° C. change in HTPG. This is somewhat expected, due to the waxes primarily not being in crystalline form at the HTPG.

Figure 3:
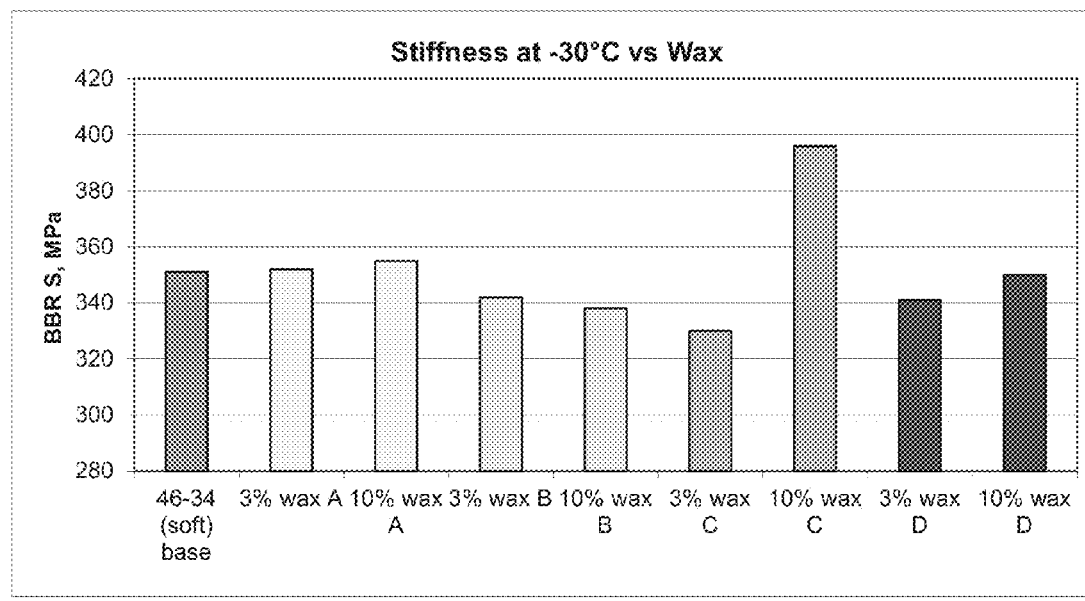
FIGS. 3 and 4 show low temperature properties of asphalts including various amounts of wax.
Figure 4:
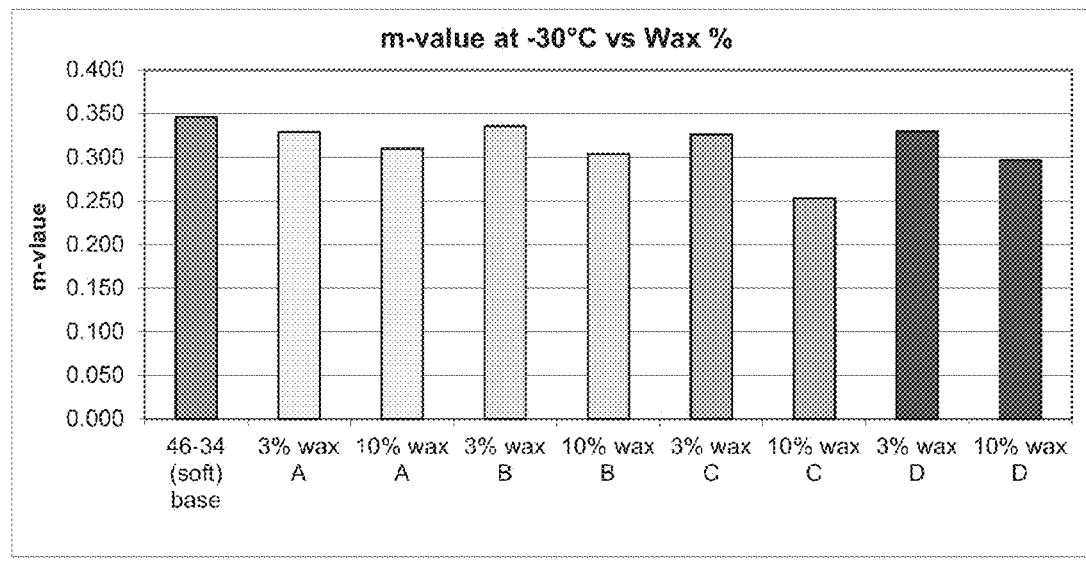

FIGS. 3 and 4 show the impact of wax addition on low temperature properties. In general, addition of waxes A-D resulted in modest changes BBR stiffness at −30° C. and a reduction in relaxation or m-value. The exception was the BBR stiffness for wax C at 110 wt %. In addition to being the lightest wax, due to being generated from a 260N feed, wax C was also the most linear wax. At 10 wt %, the additional crystal formation for wax C resulted in a notable increase in stiffness, which would correspond to a reduction in the low temperature performance grade (LTPG) for the asphalt.

Figure 5A:
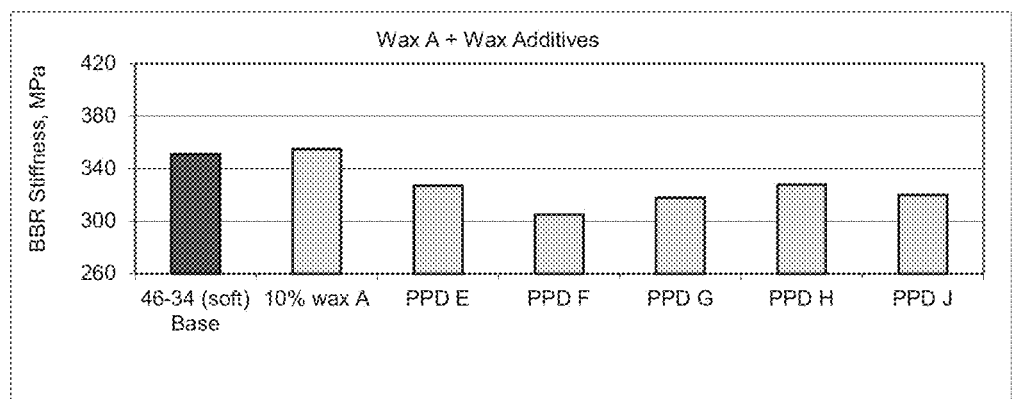
FIGS. 5a-5e show low temperature properties of asphalts including various amounts of wax and pour point depressants.
Figure 5B:
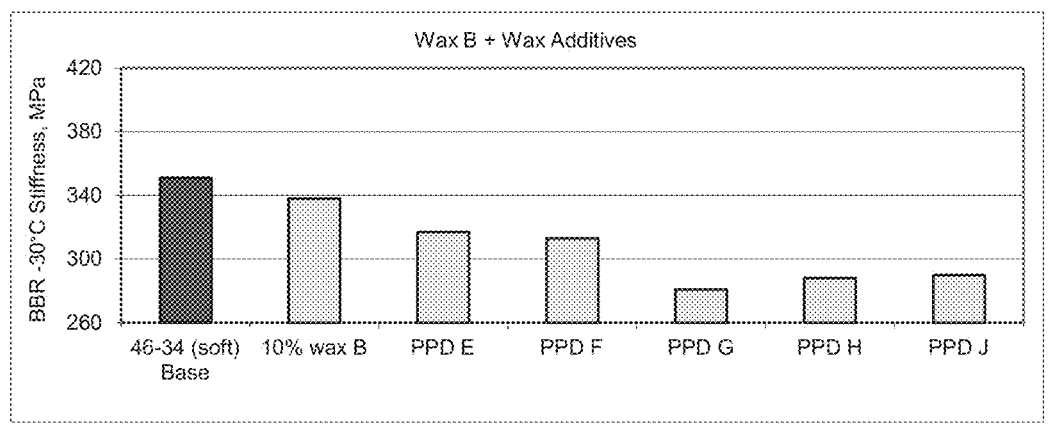
Figure 5C:
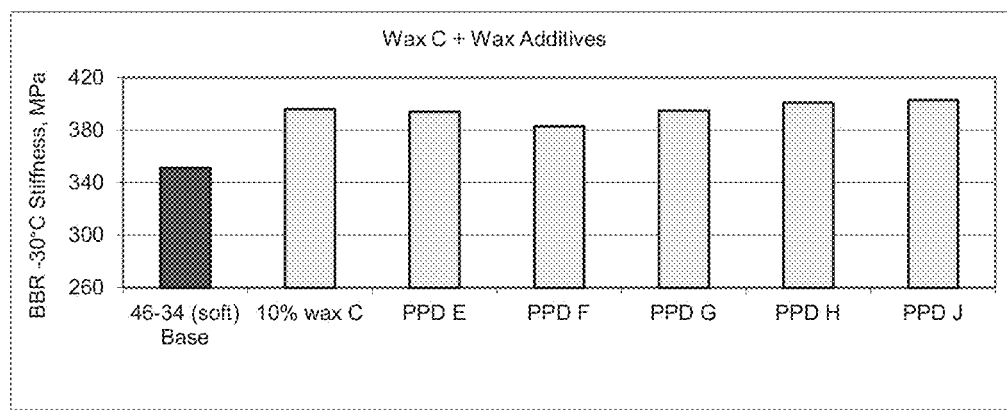
Figure 5D:
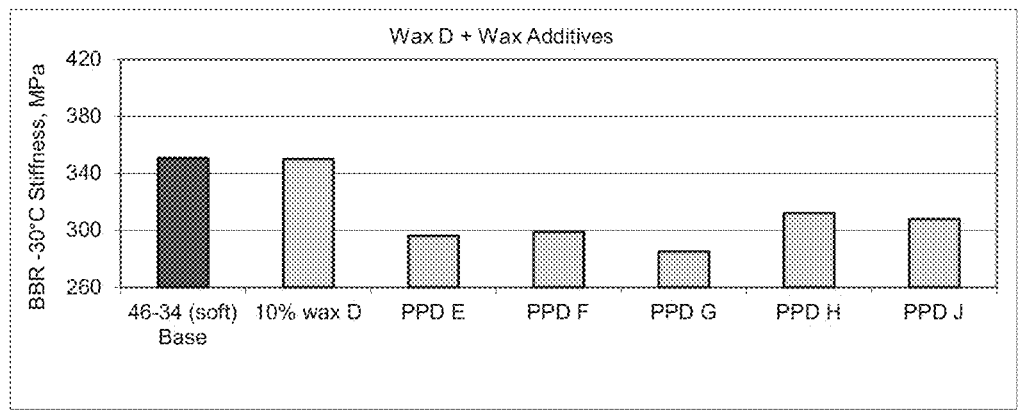
Figure 5E:
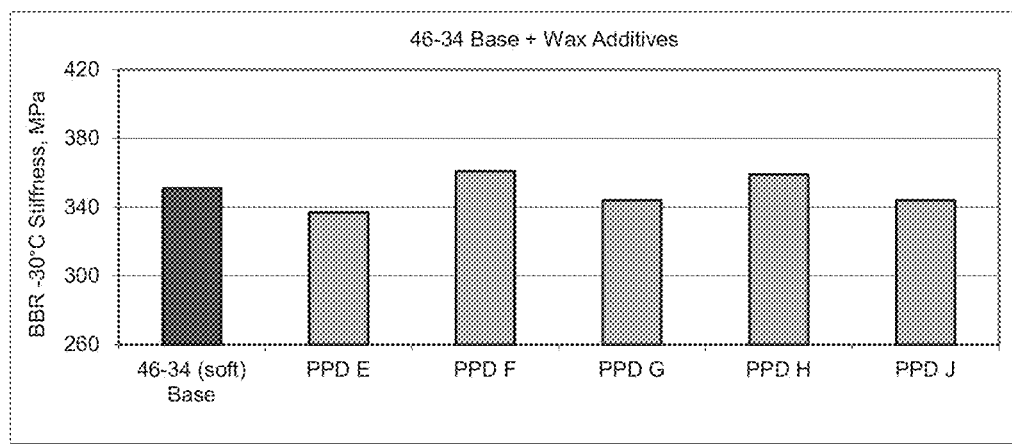
Figure 6A:
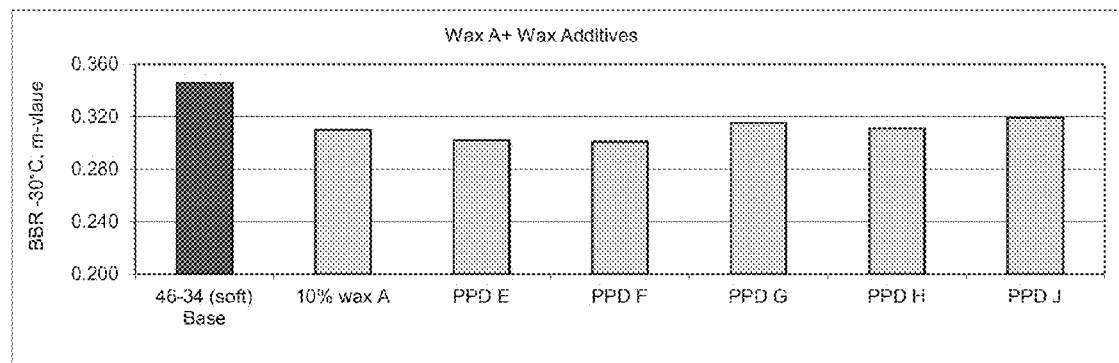
FIGS. 6a-6e show low temperature properties of asphalts including various amounts of wax and pour point depressants.
Figure 6B:
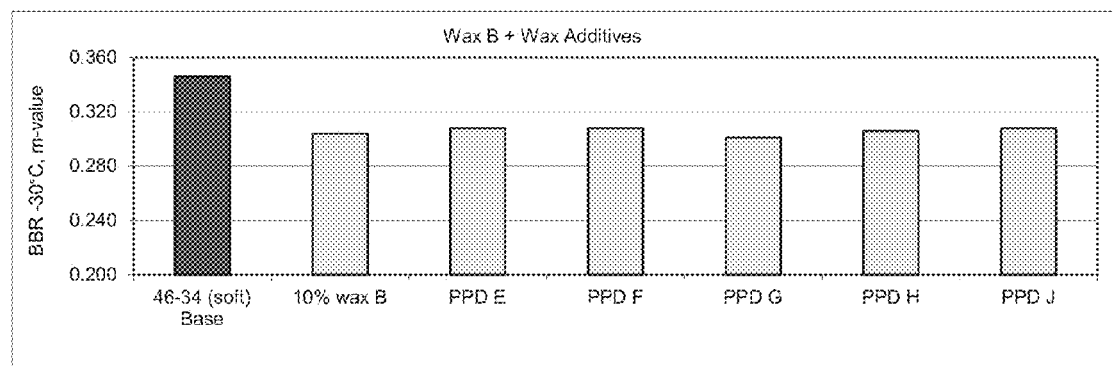
Figure 6C:
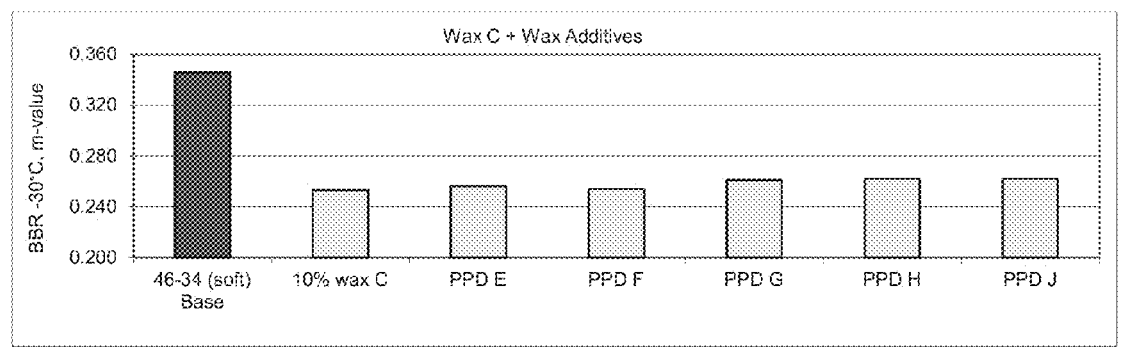
Figure 6D:
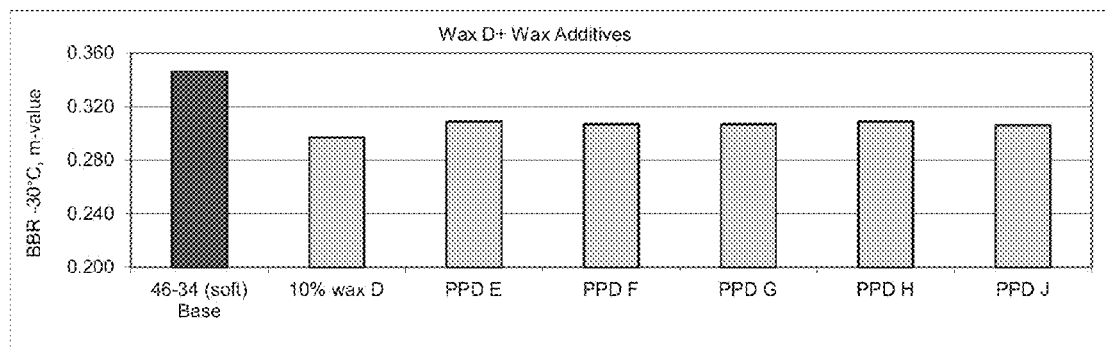
Figure 6E:
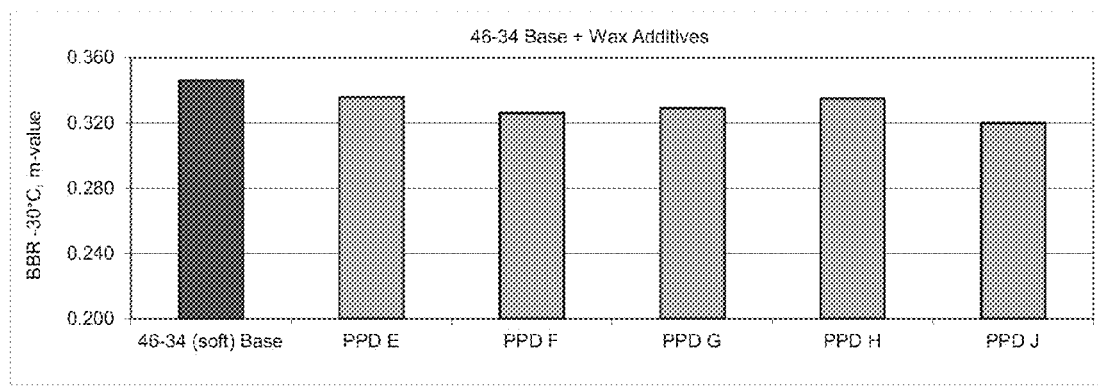

FIGS. 5a-5e show the impact on BBR stiffness at −30° C. of the various pour point depressants for the first (soft) base asphalt, optionally mixed with 10 wt % of a wax. In FIGS. 5a, 5b, and 5d, addition of a pour point depressant resulted in a noticeable decrease in BBR stiffness relative to the BBR stiffness value for the first base asphalt containing only wax. This indicates a potential improvement in low temperature performance grade (LTPG). This potential improvement is confirmed in FIGS. 6a, 6b, and 6d, which show that addition of a pour point depressant did not substantially impact the m-value or relaxation of the asphalt. Thus, the combination of a wax and a pour point depressant was able to improve the low temperature performance of the asphalt for each of the waxes generated from a feed having a viscosity of 300N or greater. Each of the various types of pour point depressants appeared to be effective for improving the low temperature properties. By contrast, FIGS. 5c and 6c show that the pour point depressants had little or no impact on the low temperature properties for the wax generated from the 260N feed. FIGS. 5e and 6e show that adding a pour point depressant without any wax (i.e., addition to just base asphalt) resulted in little or no change in BBR stiffness fir the first (soft) base asphalt.

Figure 7:
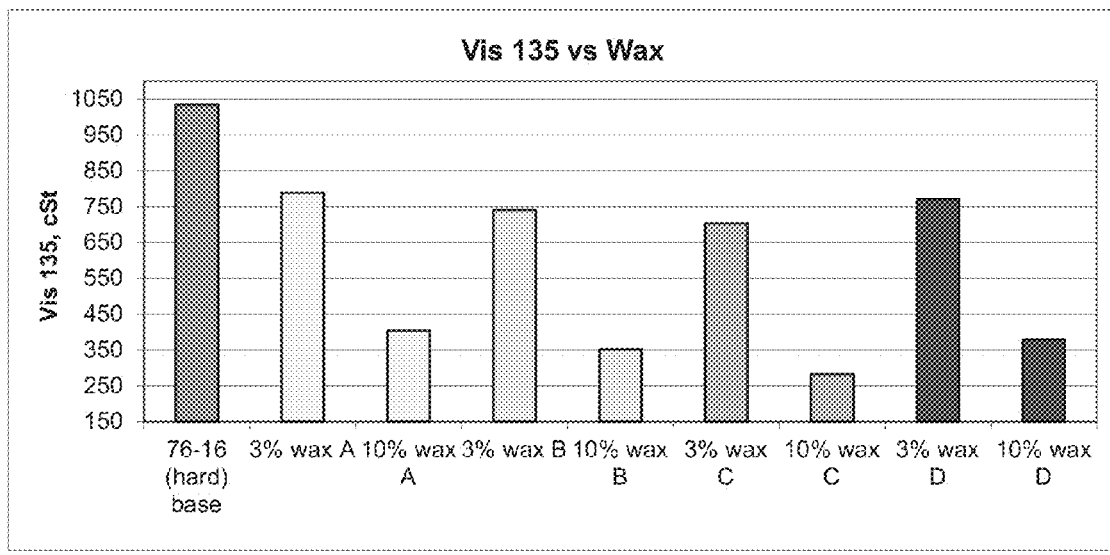
FIGS. 7 and 8 show high temperature properties of asphalts including various amounts of wax.

FIGS. 7-10 show various properties of the 76-16 base asphalt and the same asphalt with addition of either 3 wt % or 10 wt % of one of the four refinery waxes. FIG. 7 shows that each of the waxes A-D have similar effectiveness for reducing the viscosity of the second base asphalt at 135° C. This effectiveness is increased by increasing the amount of added wax from 3 wt % to 10 wt %. Thus, each of the refinery waxes is effective for reducing the viscosity of the second (hard) base asphalt at elevated temperatures, such as mixing or storage temperatures.

Figure 8:
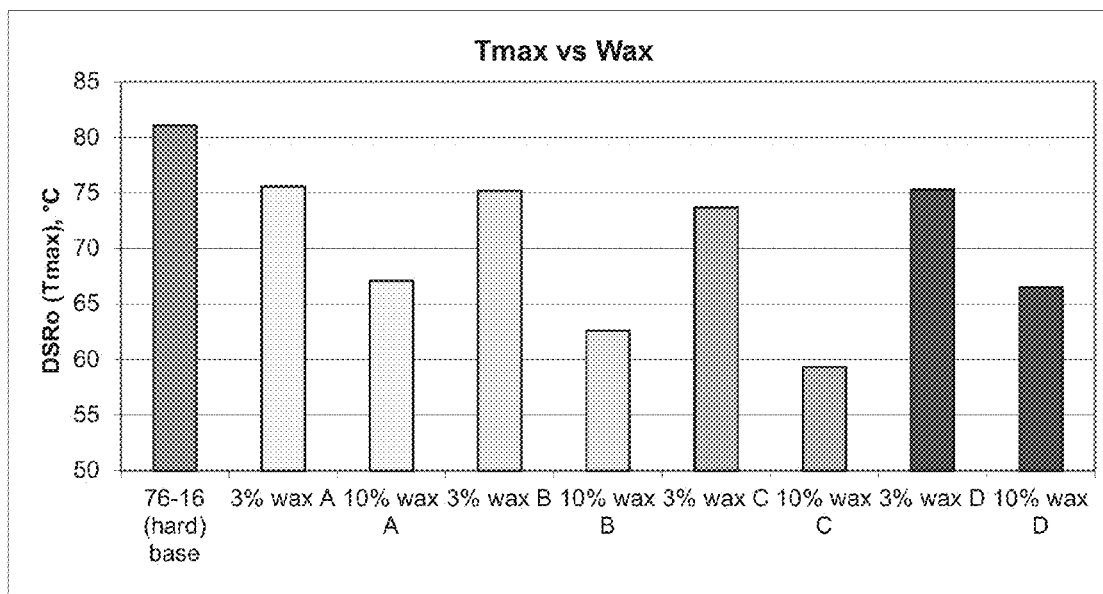

FIG. 8 shows the HTPG temperature for the second base (hard) asphalt and the second base asphalt with a wax additive. For the second base asphalt with the higher initial HTPG, addition of any wax resulted in a lowering of the HTPG temperature, with 10 wt % wax addition resulting in larger reductions than 3 wt % wax addition. This was expected, as the initial HTPG of the second base asphalt was 81° C., and therefore was above the wax crystallization temperatures of all of the waxes tested. However, due to the higher initial HTPG, the reduced HTPG temperature at even 10 wt % wax addition still results in a desirable grade of asphalt, as the HTPG value remains above the 58° C. or 64° C. value that is desirable in a paving asphalt.

Figure 9:
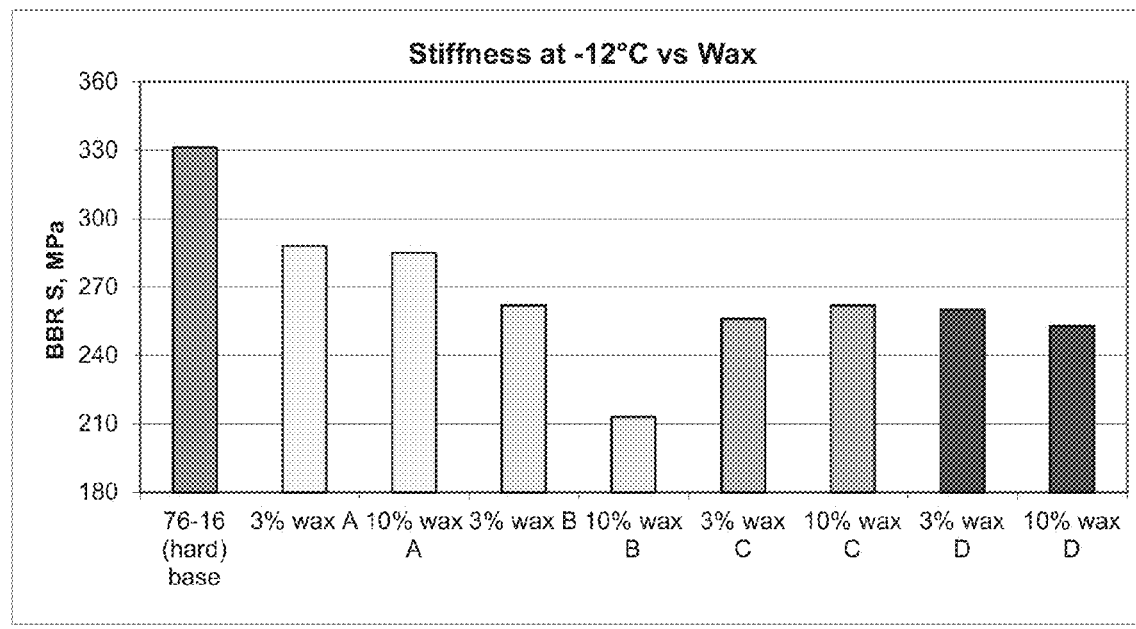
FIGS. 9 and 10 show low temperature properties of asphalts including various amounts of wax.
Figure 10:
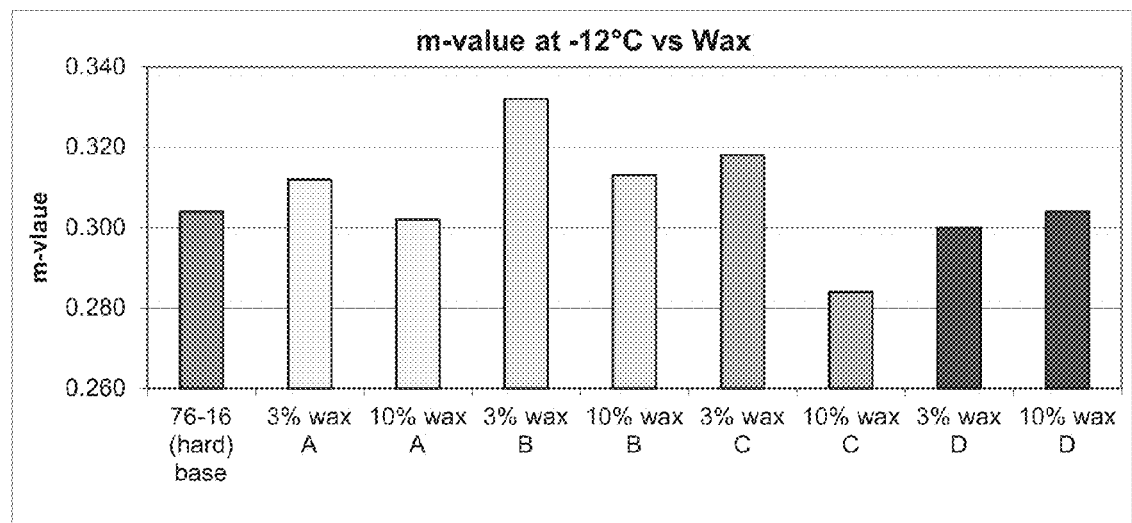

FIGS. 9 and 10 show the BBR stiffness at −30° C. and m-value for the second (hard) base asphalt and the second base asphalt with added wax. All of the waxes reduced the BBR stiffness at −12° C. to below 300 MPa, which generally indicates an improvement in low temperature performance. For each of the waxes except for Wax C, the combination of the BBR stiffness and m-value resulted in an improvement in LTPG for the asphalt from −16° C. to −22° C. When Wax C was added at 10 wt %, the LTPG remained at −16° C.

Figure 11A:
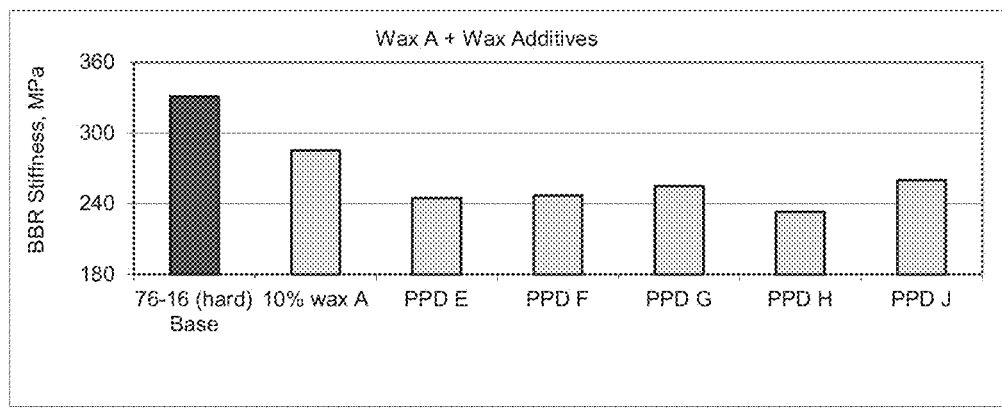
FIGS. 11a-11e show low temperature properties of asphalts including various amounts of wax and pour point depressants.
Figure 11B:
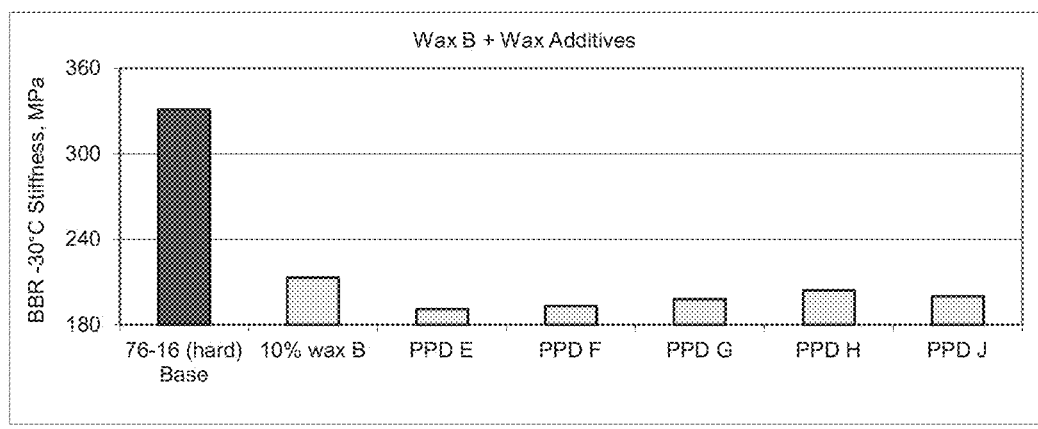
Figure 11C:
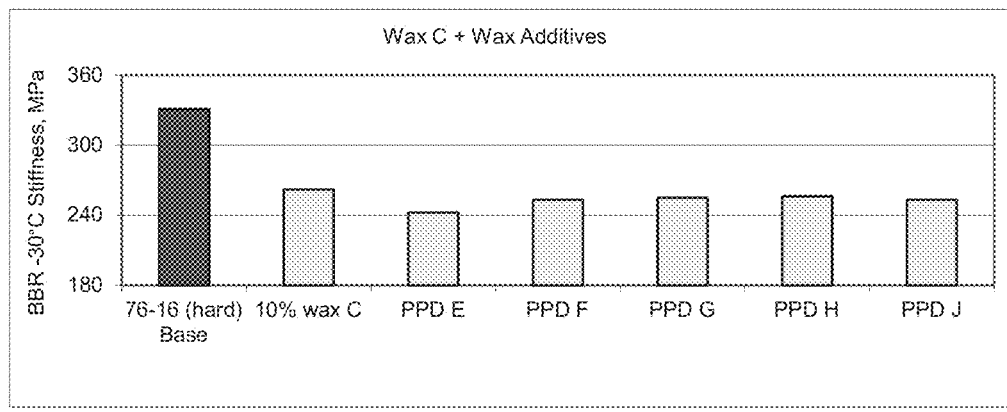
Figure 11D:
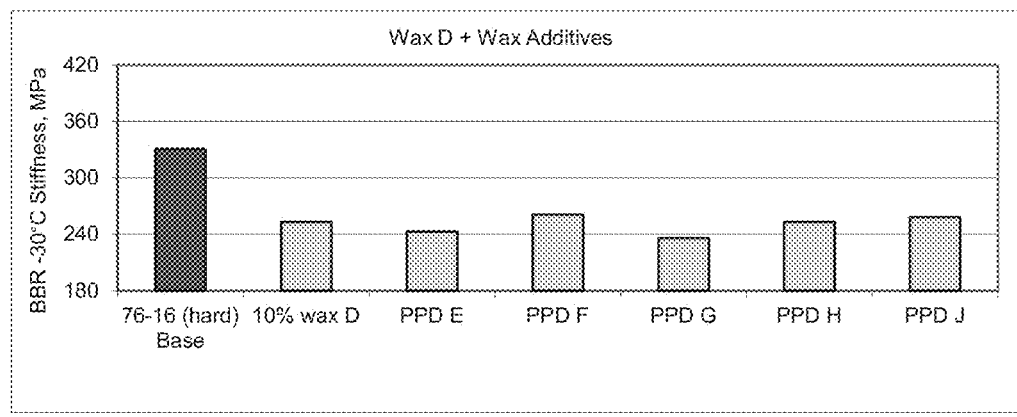
Figure 11E:
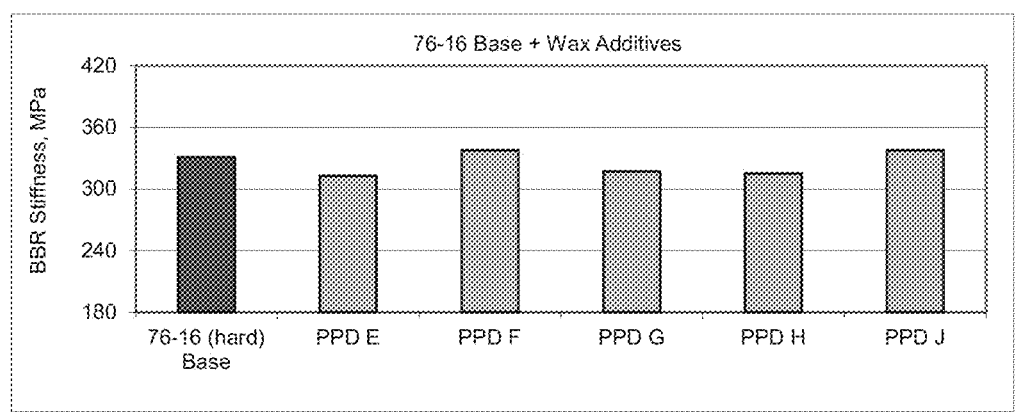
Figure 12A:
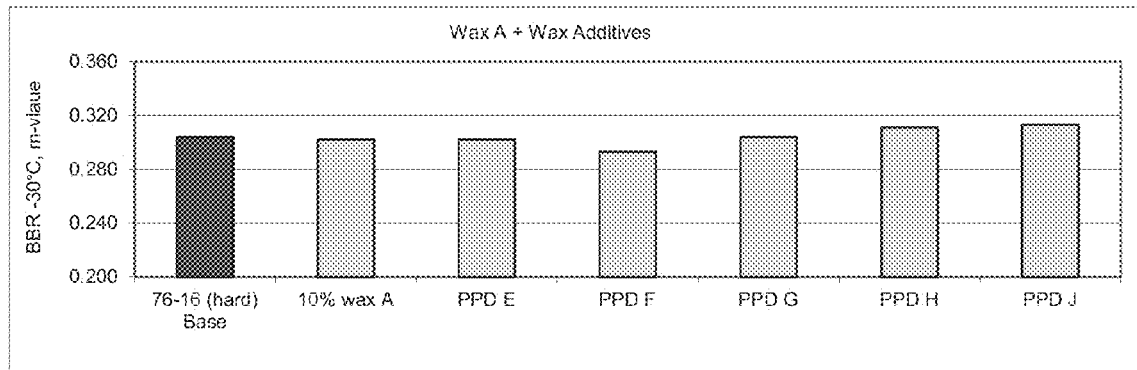
FIGS. 12a-12e show low temperature properties of asphalts including various amounts of wax and pour point depressants.
Figure 12B:
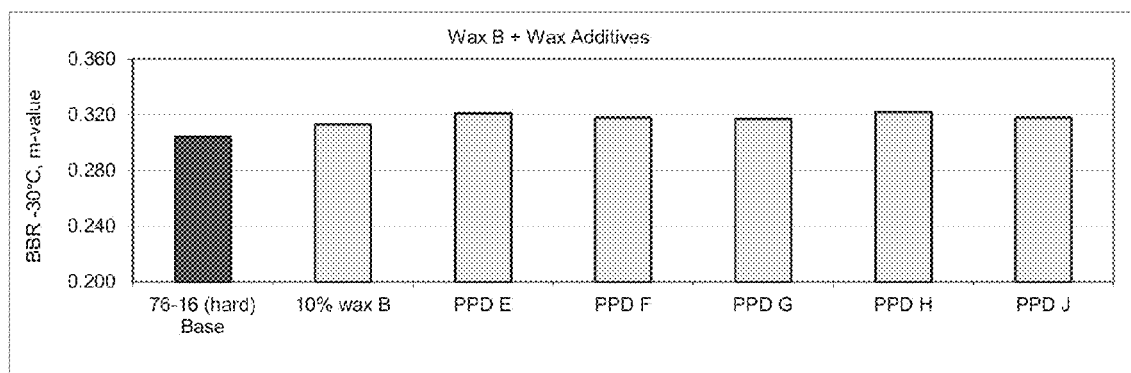
Figure 12C:
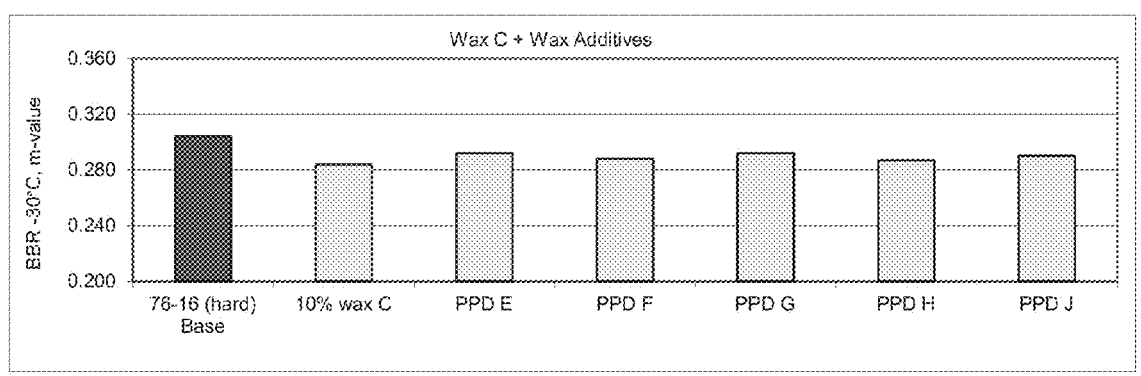
Figure 12D:
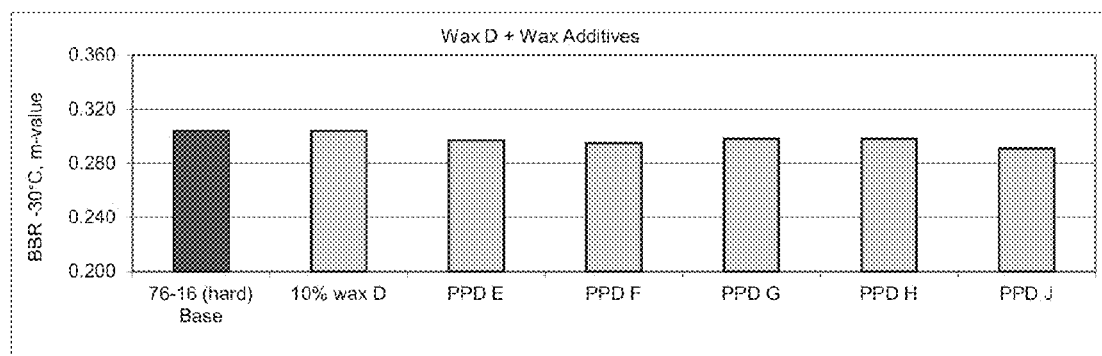
Figure 12E:
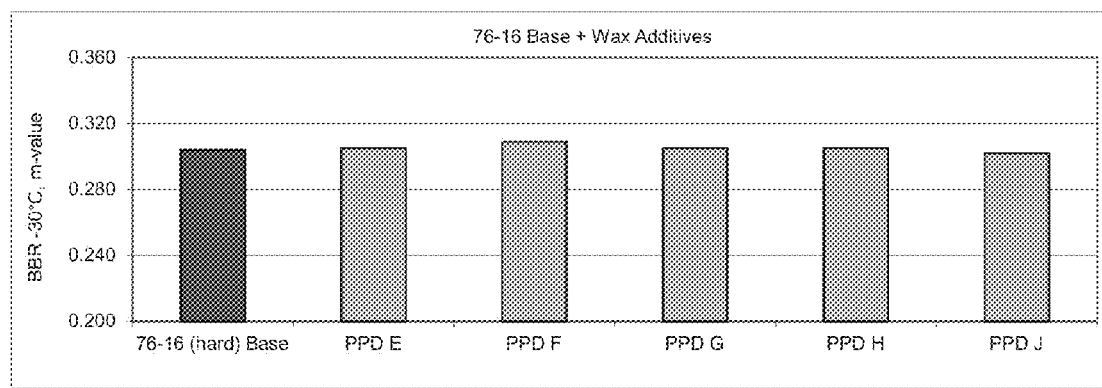

FIGS. 11a-11e show the impact on BBR stiffness at −30° C. of the various pour point depressants for the second (hard) base asphalt, optionally mixed with 10 wt % of a wax. For all of the types of added wax, addition of a pour point depressant resulted in a, noticeable decrease in BBR stiffness relative to the BBR stiffness value for the second base asphalt containing only wax as shown in FIGS. 11a-11d. This indicates a potential improvement in low temperature performance grade (LTPG). This potential improvement is confirmed in FIGS. 12a-12d, which show that addition of a pour point depressant did not substantially impact the m-value or relaxation of the asphalt. Thus, the combination of a wax and a pour point depressant was able to improve the low temperature performance of the asphalt for each of the waxes. Each of the various types of pour point depressants appeared to be effective for improving the low temperature properties. FIGS. 11e and 12e show that adding a pour point depressant without any wax (i.e., addition to just base asphalt) resulted in little or no change in BBR stiffness for the second (hard) base asphalt.

Figure 13:
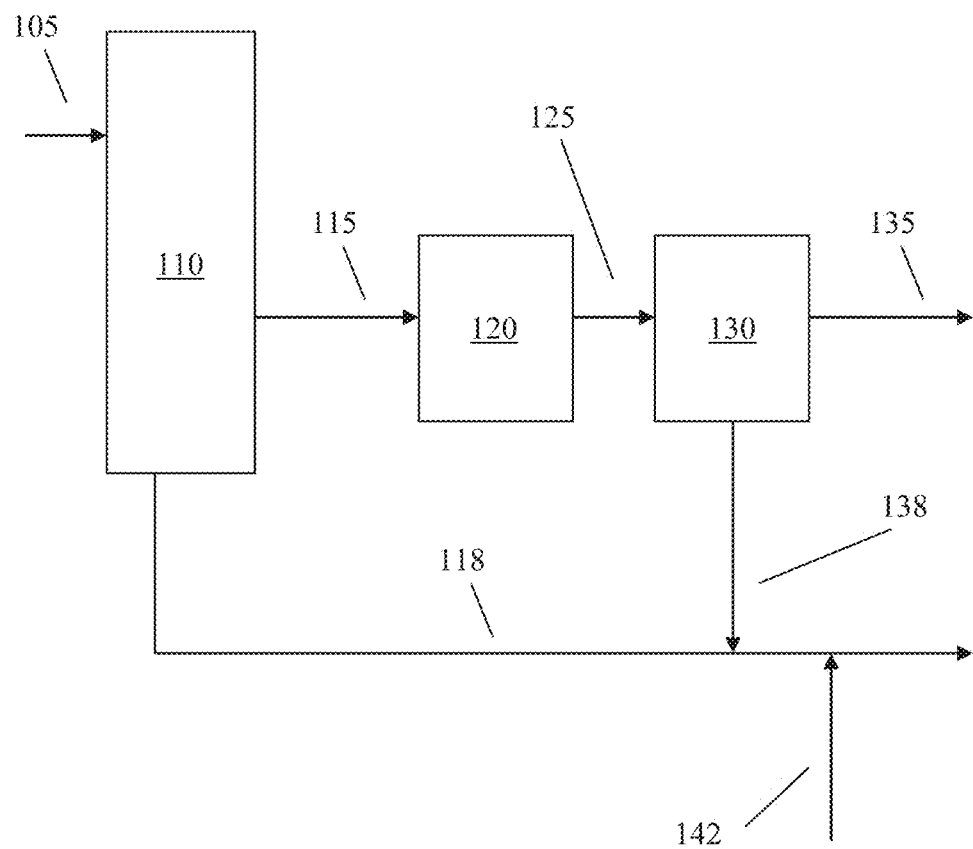
FIG. 13 shows an example of a configuration suitable for producing a wax-containing asphalt.

FIG. 13 shows an example of an integrated refinery configuration for forming asphalt containing wax while increasing the yield of vacuum gas oil from a feedstock. In FIG. 13, a feedstock 105 having a suitable boiling range for forming vacuum gas oil and asphalt fractions is passed into a vacuum distillation unit 110. The feedstock 105 can be, for example, the bottoms from an atmospheric distillation unit. The vacuum distillation unit 110 fractionates the feedstock 105 into at least a vacuum gas oil fraction 115 and a bottoms fraction 118. The bottoms fraction 118 can correspond to a base asphalt. At least a portion of vacuum gas oil fraction 115 can then be solvent dewaxed 130. Optionally, the vacuum as oil fraction 115 can undergo a solvent extraction process 120 prior to dewaxing, to remove a portion of the aromatics present in the vacuum gas oil fraction 115. In such a configuration, the raffinate 125 from solvent extraction process 120 corresponds to the input stream for solvent dewaxing 130. Solvent dewaxing 130 produces a dewaxed oil output 135 which is suitable for further processing and/or for use as a lubricant base oil. Solvent dewaxing 130 also generates a wax output 138. At least a portion of wax output 138 can be combined with bottoms fraction 118 to form a mixture of wax in asphalt. A pour point depressant 142 can be added to the bottoms fraction 118 and/or wax output 138 at any convenient location.

PCT/EP Clauses:

1. A method for upgrading an asphalt teed, comprising: fractionating a feedstock containing at least a portion derived from a mineral crude oil at a cut point of at least 750° F. (399° C.) to form an asphalt fraction that contains a first amount of wax; and mixing the asphalt fraction with a pour point depressant to form an asphalt product, an amount of the pour point depressant being less than 10 wt % of an amount of wax in the asphalt product, the amount of wax in the asphalt product being at least 3 wt %.

2. The method of clause 1, further comprising mixing the asphalt fraction with a refinery wax, the amount of wax in the asphalt product comprising at least the first amount of wax and the refinery wax.

3. The method of clause 2, wherein the asphalt fraction is mixed with at least 3 wt % of the refinery wax, such as at least 5 wt %.

4. The method of clause 2 or 3, wherein the feedstock is fractionated to form an asphalt fraction and one or more vacuum gas oil fractions, the method further comprising dewaxing at least a portion of the one or more vacuum gas oil fractions under effective solvent dewaxing conditions to form a dewaxed vacuum gas oil and a refinery wax product, wherein the asphalt fraction is mixed with a refinery wax comprising the refinery wax product.

5. The method of clause 4, further comprising performing a solvent extraction on the at least a portion of the one or more vacuum gas oil fractions to form an extract portion and a raffinate portion, the raffinate portion having a lower percentage of aromatics than the extract portion, wherein dewaxing at least a portion of the one or more vacuum gas oil fractions comprises dewaxing the raffinate portion.

6. The method of any of the preceding clauses, wherein the combined amount of wax is at least 5 wt % of the asphalt product, such as at least 8 wt % or at least 10 wt %.

7. The method of any of the preceding clauses, wherein the asphalt fraction is mixed with at least 5 wt % of a refinery wax, such as at least 8 wt %.

8. The method of any of the preceding clauses, wherein the refinery wax comprises a slack wax, a scale wax, or a combination thereof.

9. The method of any of the preceding clauses, wherein the cut point for forming the asphalt fraction is at least 950° F. (510° C.), such as at least 1110° F. (593° C.).

10. The method of any of the preceding clauses, wherein the refinery wax is derived from a feedstock having a viscosity of at least 300N, such as at least 500N.

11. The method of any of the preceding clauses, wherein the asphalt fraction has a SUPERPAVE™ low temperature performance grade temperature of at least −22° C.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A method for upgrading an asphalt feed, comprising:
fractionating a feedstock containing at least a portion derived from a mineral crude oil at a cut point of at least 750° F. (399° C.) to form an asphalt fraction that contains a first amount of wax; and
mixing the asphalt fraction with a pour point depressant and at least 3 wt % of a refinery wax to form an asphalt product, an amount of the pour point depressant being less than 10 wt % of a combined amount of wax in the asphalt product, the amount of the pour point depressant being 0.5 wt % or less of the asphalt product, the combined amount of wax comprising the first amount of wax and the refinery wax.

2. The method of claim 1, wherein the combined amount of wax is at least 10 wt % of the asphalt product.

3. The method of claim 1, wherein the asphalt fraction is mixed with at least 5 wt % of a refinery wax.

4. The method of claim 1, wherein the amount of the pour point depressant is less than 8 wt % of the refinery wax.

5. The method of claim 1, wherein the refinery wax comprises a slack wax, a scale wax, or a combination thereof.

6. The method of claim 1, wherein the cut point for forming the asphalt fraction is at least 950° F. (510° C.).

7. The method of claim 1, wherein the cut point for forming the asphalt fraction is at least 1100° F. (593° C.).

8. The method of claim 1, wherein the refinery wax is derived from a feedstock having a viscosity of at least 300N.

9. The method of claim 1, wherein the refinery wax is derived from a feedstock having a viscosity of at least 500N.

10. The method of claim 1, wherein the asphalt fraction has a SUPERPAVE™ low temperature performance grade temperature of at least −22° C.

11. A method for upgrading an asphalt feed, comprising:
fractionating a feedstock containing at least a portion derived from a mineral crude oil to form an asphalt fraction and one or more vacuum gas oil fractions, a cut point between the asphalt fraction and a vacuum gas oil fraction being at least 750° F. (399° C.);
dewaxing at least a portion of the one or more gas oil fractions under effective solvent dewaxing conditions to form a dewaxed vacuum gas oil and a refinery wax product; and
mixing the asphalt fraction with a pour point depressant and at least 5 wt % of the refinery wax product to form an asphalt product, an amount of the pour point depressant being less than 10 wt % of an amount of wax in the asphalt product, the amount of the pour point depressant being 0.5 wt % or less of the asphalt product, the amount of wax in the asphalt product comprising the refinery wax.

12. The method of claim 11, wherein the asphalt fraction has a SUPERPAVE™ low temperature performance grade temperature of at least −22° C.

13. The method of claim 11, further comprising
separating at least vacuum one gas oil fraction to form a vacuum gas oil feed having a viscosity of at least 300N, wherein dewaxing at least a portion of the one or more vacuum gas oil fractions comprises dewaxing the vacuum gas oil feed having a viscosity of at least 300N.

14. The method of claim 11, further comprising
performing a solvent extraction on the at least a portion of the one or more vacuum gas oil fractions to form an extract portion and a raffinate portion, the raffinate portion having a lower percentage of aromatics than the extract portion, wherein dewaxing at least a portion of the one or more vacuum gas oil fractions comprises dewaxing the raffinate portion.

15. The method of claim 11, wherein the combined amount of wax is at least 10 wt % of the asphalt product.

16. The method of claim 11, wherein the asphalt fraction is mixed with at least 8 wt % of the refinery wax product.

17. The method of claim 11, wherein the cut point for forming the asphalt fraction is at least 950° F. (510° C.).

18. A method for upgrading an asphalt feed, comprising:
   fractionating a feedstock containing at least a portion derived from a mineral crude oil at a cut point of at least 750° F. (399° C.) to form an asphalt fraction that contains a first amount of wax; and
   mixing the asphalt fraction with a pour point depressant and at least 5 wt % of a refinery wax to form an asphalt product, an amount of the pour point depressant being less than 10 wt % of a combined amount of wax in the asphalt product, the combined amount of wax in the asphalt product being 5 wt % to 10 wt %, the combined amount of wax comprising the first amount of wax and the refinery wax.

19. The method of claim 18, wherein the asphalt fraction has a SUPERPAVE™ low temperature performance grade temperature of at least −22° C.

20. The method of claim 18, wherein the cut point for forming the asphalt fraction is at least 950° F. (510° C.).

* * * * *